US006987916B2

(12) United States Patent  
Storaasli

(10) Patent No.: US 6,987,916 B2
(45) Date of Patent: Jan. 17, 2006

(54) FIBER OPTIC CENTRAL TUBE CABLE WITH BUNDLED SUPPORT MEMBER

(75) Inventor: Olaf Storaasli, Hickory, NC (US)

(73) Assignee: Alcatel, Paris (FR)

( * ) Notice: Subject to any disclaimer, the term of this patent is extended or adjusted under 35 U.S.C. 154(b) by 220 days.

(21) Appl. No.: 10/020,173

(22) Filed: Dec. 18, 2001

(65) Prior Publication Data

US 2003/0113079 A1 Jun. 19, 2003

(51) Int. Cl.
G02B 6/44 (2006.01)

(52) U.S. Cl. .............. 385/111; 385/113; 385/136; 385/137

(58) Field of Classification Search ......... 385/136–137, 385/100, 102–105, 109–114
See application file for complete search history.

(56) References Cited

U.S. PATENT DOCUMENTS

| 3,273,083 | A | | 9/1966 | Rose |
| 3,327,255 | A | | 6/1967 | Bolljahn et al. |
| 4,186,359 | A | | 1/1980 | Kaegebein |
| 4,249,147 | A | | 2/1981 | Kaegebein |
| 4,464,640 | A | | 8/1984 | Nishikawa et al. |
| 4,709,983 | A | | 12/1987 | Plessner et al. |
| 4,801,192 | A | | 1/1989 | Wehner |
| 4,890,078 | A | | 12/1989 | Radcliffe |
| 5,042,904 | A | * | 8/1991 | Story et al. ............... 385/105 |
| 5,051,714 | A | | 9/1991 | Bentivenga et al. |
| 5,153,541 | A | | 10/1992 | Johnson et al. |
| 5,157,752 | A | * | 10/1992 | Greveling et al. .......... 385/112 |
| 5,218,658 | A | | 6/1993 | Macleod |
| 5,262,742 | A | | 11/1993 | Bentivenga |
| 5,345,526 | A | * | 9/1994 | Blew ....................... 385/112 |
| 5,389,442 | A | | 2/1995 | Arroyo et al. |
| 5,390,273 | A | * | 2/1995 | Rahman et al. ............ 385/112 |
| 5,446,729 | A | | 8/1995 | Jachowski |
| 5,448,670 | A | * | 9/1995 | Blew et al. ................ 385/112 |
| 5,555,338 | A | | 9/1996 | Haag et al. |
| 5,689,607 | A | * | 11/1997 | Vincent et al. ............. 385/136 |
| 5,714,919 | A | | 2/1998 | Satoh et al. |
| 5,748,058 | A | | 5/1998 | Scott |
| 5,761,361 | A | * | 6/1998 | Pfandl et al. .............. 385/100 |
| 5,777,534 | A | | 7/1998 | Harrison |
| 5,905,834 | A | * | 5/1999 | Anderson et al. .......... 385/111 |
| 5,999,676 | A | | 12/1999 | Hwang |
| 5,999,677 | A | | 12/1999 | Moncisvais et al. |
| 6,066,397 | A | | 5/2000 | Risch et al. |
| 6,081,175 | A | | 6/2000 | Duong et al. |
| 6,084,487 | A | | 7/2000 | Hoffman |
| 6,185,351 | B1 | * | 2/2001 | Daneshvar et al. ......... 385/114 |
| 6,208,221 | B1 | | 3/2001 | Pelz et al. |
| 6,222,429 | B1 | | 4/2001 | Satoh et al. |
| 6,236,789 | B1 | * | 5/2001 | Fitz ......................... 385/101 |
| 6,253,012 | B1 | | 6/2001 | Keller et al. |
| 6,483,971 | B2 | * | 11/2002 | Gaillard et al. ............ 385/113 |

FOREIGN PATENT DOCUMENTS

| EP | 0 564 130 A1 | | 10/1993 |
| GB | 2 159 291 A | | 11/1985 |
| GB | 2161618 | * | 1/1986 |
| JP | 2-238412 | * | 9/1990 |

\* cited by examiner

Primary Examiner—Jay Patidar
(74) Attorney, Agent, or Firm—Sughrue Mion, PLLC

(57) ABSTRACT

A central tube cable, including a cable jacket defining an optical fiber cavity therein; at least one radial strength member embedded in the jacket; a plurality of optical fibers disposed within the optical fiber cavity; and a bundle support member disposed inside the optical fiber cavity to limit movement of the optical fibers with respect to the bundle support member. The optical fibers are preferably housed in buffer tubes and at least some of the buffer tubes contact the bundle support member. The buffer tubes are either helically stranded around the bundle support member or are S-Z stranded. The optical fibers may be provided in the form of optical fiber ribbons that are located in the optical fiber cavity.

23 Claims, 2 Drawing Sheets

FIBER OPTIC CENTRAL TUBE CABLE WITH BUNDLED SUPPORT MEMBER

BACKGROUND OF THE INVENTION

1. Field of the Invention

The invention relates to a central tube fiber optic cable having a bundle support member for supporting optical fibers therein.

2. Background

There are generally two basic types of optical fiber cables including a Central Tube Cable and a Loose Tube Cable. A Loose Tube Cable includes a central strength member around which buffer tubes, housing the fibers, are wound. A jacket is provided around the buffer tubes. A Central Tube Cable does not have a central strength member in the optical fiber cavity. Instead, a Central Tube Cable generally includes a pair of radial strength members that are embedded in the cable jacket at positions diametrically opposite one another. The central cavity defined by the jacket, without any strength member, may include bare fibers, ribbons or buffer tubes containing optical fibers.

The problem with the Central Tube Cable design with buffer tubes is that, other than friction between the buffer tubes and the inner surface of the jacket, there is nothing to prevent the buffer tubes from moving along the longitudinal axis of the cable. In aerial applications, these Central Tube Cables are installed between telephone poles, normally using a lashing method, on a steel messenger. At the end of the cable segment, the cable is connected to a splice box in which the fibers of one cable are spliced with the fibers of another cable. In order to support the cable, the radial strength members, that are embedded in the cable jacket, are fixedly secured to the splice box.

When the cable is subjected to a significant load (due to sag, wind, ice build-up or the like) the buffer tubes and fibers are also subjected to a strain. Since the buffer tubes and fibers are not restrained against axial movement, the strain resulting from the load may cause the buffer tubes and associated fibers to be pulled out of the splice box detrimentally affecting the optical performance of the fibers.

SUMMARY OF THE INVENTION

The invention is directed to a central tube cable, comprising a cable jacket defining an optical fiber cavity therein; at least one radial strength member embedded in the jacket; a plurality of optical fibers disposed within the optical fiber cavity; and a bundle support member disposed inside the optical fiber cavity to limit movement of the optical fibers with respect to the bundle support member. The optical fibers are preferably housed in buffer tubes and at least some of the buffer tubes contact the bundle support member. Further, according to a preferred embodiment, the buffer tubes are either helically stranded around the bundle support member or are S-Z stranded.

According to another aspect of the invention, the optical fibers could be provided in the form of optical fiber ribbons that are located in the optical fiber cavity.

DETAILED DESCRIPTION OF THE INVENTION

Figure 1:
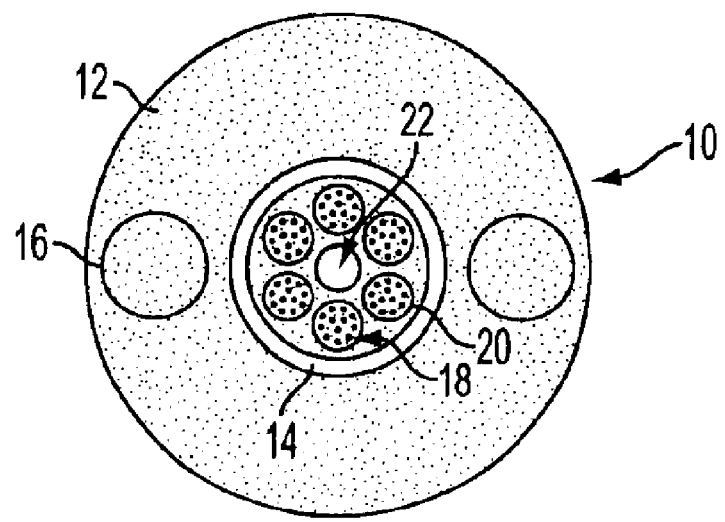
FIG. 1 is a cross-sectional view of the central tube cable, according to a first preferred embodiment of the invention.

Referring to FIG. 1, the central tube cable 10 includes a jacket 12 defining an optical fiber cavity 14 therein; a pair of radial strength members 16 embedded in the jacket at positions diametrically opposite each other; a plurality of optical fibers 18 housed in buffer tubes 20 which are disposed within the optical fiber cavity 14; and a bundle support member 22 disposed inside the optical fiber cavity 14. The buffer tubes 20 are either helically stranded around the bundle support member 22, or are S-Z stranded. Alternatively, although not preferred, the buffer tubes can be randomly arranged with respect to the bundle support member 22.

The bundle support member may be rigid or flexible. For example, the bundle support member may be a fibrous material which has been impregnated with a super-absorbent material. An example of the fibrous strength member is KEVLAR® yarn, a product that is commercially available from E. I. Dupont de Nemours. KEVLAR® is a Dupont trademark for a family of aramid fibers. Such fibrous material may be short fiber as well as continuous filament yarn. Alternatively, the bundle support member could include a buffer tube that is filled with a KEVLAR® material or the like. An advantage with this arrangement is that the outer surface of the buffer tube has a coefficient of friction that would effectively prevent the adjacent buffer tubes, filled with optical fiber, from moving relative thereto.

On the other hand, the bundle support member is not required to withstand compressive or bending stresses. Rather, the bundle support member need only be capable of withstanding tensile stress which might result when the cable is subjected to a load. Therefore, the bundle support member may be flexible. Thus, the bundle support member may be made out of a string-like material. An example of such a strength member is KEVLAR®yarn, a product that is commercially available from E. I. Dupont de Nemours. KEVLAR®is a DuPont trademark for a family of aramid fibers. Other suitable materials include fiberglass, polyester, high tensile polypropylene, or the like.

According to the invention, the two radial strength members provide the necessary strength to handle the bending and compressive loads experienced by an aerial cable. On the other hand, as explained above, an important concern of the invention is that the buffer tubes not be pulled away from the splice box when the cable experiences strain. Since the conventional cable does not include a bundle support member within the optical fiber cavity, the buffer tubes and fibers are allowed to move axially in the jacket so that the fibers can be pulled away from the splice box.

Figure 3:
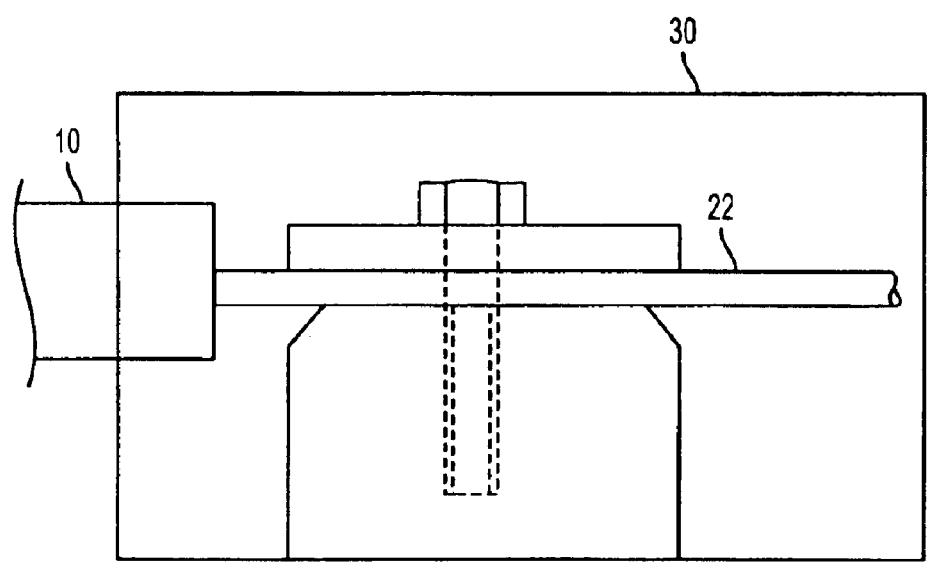
FIG. 3 is a cross-sectional view of a splice box containing a central tube cable.

In contrast, according to the present invention, due to the friction between the buffer tubes and the bundle support member, axial movement of the buffer tubes with respect to the jacket is severely restricted when the ends of the bundle support member 22 are secured to the respective splice boxes 30 (FIG. 3). Therefore, the buffer tubes and fibers will not pull away from the splice closure when the cable is subjected to high loads.

Having described the invention with particular reference to the preferred embodiments, it will be obvious to those skilled in the art to which the invention pertains after understanding the invention, that various modifications and changes may be made therein without departing from the spirit and scope of the invention as defined by the claims appended hereto.

Figure 2:
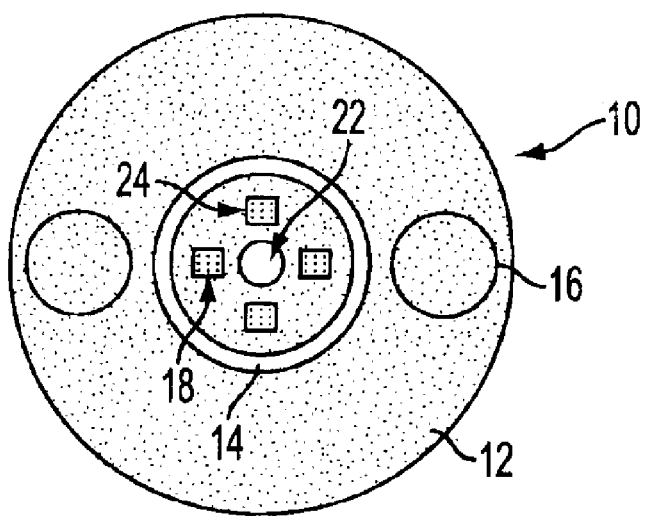
FIG. 2 is a cross-sectional view of the central tube cable, according to a second preferred embodiment of the invention.

For example, although the invention has been described above with reference to incorporating buffer tubes in the cable, the invention is not limited in this respect. The invention is applicable to cables in which the optical fibers are provided in the optical fiber cavity, without any buffer tubes. Further, the optical fibers could be in the form of optical fiber ribbons 24 that are positioned in the optical fiber cavity 14, as illustrated in FIG. 2. Like the first embodiment, the ribbons can be either helically stranded around the bundle support member 22 or S-Z stranded. Alternatively, the ribbons can be randomly arranged with respect to the bundle support member.

Further, although it is preferred that the cable include two radial strength members, the invention is not limited in this respect. For example, the cable could include just one radial strength member or three or more.

What is claimed is:

1. A central tube cable, comprising:
   a cable jacket defining an optical fiber cavity therein;
   at least one radial strength member embedded in said jacket;
   a plurality of optical fibers disposed within said optical fiber cavity; and
   a bundle support member disposed inside said optical fiber cavity to limit axial movement of said optical fibers with respect to said bundle support member,
   wherein at least one end of said bundle support member is securable to a splice box.

2. The central tube cable of claim 1, wherein said optical fibers are helically wound around said bundle support member.

3. The central tube cable of claim 1, where said optical fibers are S-Z stranded around said bundle support member.

4. The central tube cable of claim 1, wherein said bundle support member is rigid.

5. The central tube cable of claim 1, wherein said bundle support member is flexible.

6. The central tube cable of claim 1, further comprising a plurality of buffer tubes in which said optical fibers are respectively housed.

7. The central tube cable of claim 6, wherein at least some of said buffer tubes contact said bundle support member.

8. The central tube cable of claim 7, wherein said buffer tubes are helically stranded around said bundle support member.

9. The central tube cable of claim 7, wherein said buffer tubes are S-Z stranded around said bundle support member.

10. The central tube cable of claim 1, wherein said optical fibers are held together as an optical fiber ribbon.

11. The central tube cable of claim 10, wherein said optical fibers are held together as a plurality of optical fiber ribbons.

12. The central tube cable of claim 11, wherein said optical fiber ribbons are helically stranded around said bundle support member.

13. The central tube cable of claim 11, where said optical fiber ribbons are S-Z stranded around said bundle support member.

14. A central tube cable, comprising:
    a cable jacket defining an optical fiber cavity therein;
    a plurality of optical fibers disposed within said optical fiber cavity; and
    a bundle support member disposed inside said optical fiber cavity to limit axial movement of said optical fibers with respect to said bundle support member, said bundle support member being string-like,
    wherein at least one end of said bundle support member is securable to a splice box.

15. The central tube cable of claim 14, wherein said optical fibers are helically wound around said bundle support member.

16. The central tube cable of claim 14, where said optical fibers are S-Z stranded around said bundle support member.

17. The central tube cable of claim 14, further comprising a plurality of buffer tubes in which said optical fibers are respectively housed.

18. The central tube cable of claim 17, wherein at least some of said buffer tubes contact said bundle support member.

19. The central tube cable of claim 18, wherein said buffer tubes are helically stranded around said bundle support member.

20. The central tube cable of claim 18, wherein said buffer tubes are S-Z stranded around said bundle support member.

21. The central tube cable of claim 14, wherein said optical fibers are held together as an optical fiber ribbon.

22. The central tube cable of claim 14, wherein said optical fibers are held together as a plurality of optical fiber ribbons.

23. A central tube cable, comprising:
    a cable jacket defining an optical fiber cavity therein;
    at least one radial strength member embedded in said jacket;
    a plurality of optical fibers disposed within said optical fiber cavity; and
    means for securing said central tube cable to a splice box and for preventing axial movement of said optical fibers,
    wherein said means is partially disposed inside said optical fiber cavity.

* * * * *